United States Patent Office 2,843,510
Patented July 15, 1958

2,843,510

CATHODE DEPOLARIZER FOR PRIMARY CELLS WITH ACIDIC ELECTROLYTES

Leslie D. McGraw, Columbus, Ohio, assignor to the United States of America as represented by the Secretary of the Army No Drawing. Application September 5, 1956
Serial No. 608,172

4 Claims. (Cl. 136—138)

This invention relates to a new cathode depolarizer for electric primary cells having an acidic electrolyte.

It has been found that manganic phosphate ($MnPO_4$) may be advantageously used as a cathode depolarizer for electric primary cells having an acidic electrolyte of a pH of less than about 5.

Any metal which may normally be used as the anode together with an acid electrolyte is suitable as the anode with the new cathode depolarizer of the present invention. Lead or zinc may, for example, be used as such anodic materials with manganic phosphate as the cathodic material in the presence of an acid electrolyte having a pH of less than about 5. No appreciable decomposition of the anodic material takes place when the cell is not in use.

According to a preferred embodiment of the present invention manganic phosphate is used as the depolarizing material together with a strongly acidic aqueous solution comprising about 30% sulfuric acid, or 50% fluoboric acid, or 40% phosphoric acid, or various mixtures of these acids. The essential characteristic of the acidic electrolyte to be used is that it has to have a hydrogen ion concentration (pH) of less than about 5.

In order to impart to the new cathodic depolarizer material the necessary electronic conductivity the manganic phosphate is mixed in well known manner with conventional inert conductive materials such as finely divided carbon or graphite. Various amounts of carbon black and manganic phosphate may be intimately mixed together and made up into a bobbin having the conventional carbon rod or a rod of other suitable conducting material and a porous container consisting, for instance, of Alundum or Dacron for holding the cathodic material together.

The following specific example will illustrate the invention: 9 gms. of manganic phosphate ($MnPO_4$) and 1 gram of Shawinigan black were mixed by rolling in a screw-cap glass jar with ten ½-inch diameter porcelain balls for several hours. After one hour, the mix was perceptibly darker than pure $MnPO_4$. After two hours, the mix was still darker, and after four hours the mix was a dark gray. Examination of the mix at 30× under a binocular microscope showed the $MnPO_4$ to be uniformly coated. By comparison, a 1:1 mix which had been rolled for two hours did not appear to be uniformly coated when examined under the microscope, although the gross color was darker.

The 9:1 mix with Shawinigan black was made into a cathode and immersed in 50% fluoboric acid using a lead anode. It was discharged at 100 milliamperes; after a slight initial drop in potential the cell discharged at a voltage which slowly decreased from 0.72 volt to about 0.5 volt over a discharge period of about 5 hours.

The manganic phosphate used as depolarizer for the present invention may be made according to any known method. It has been found, however, that manganic phosphates made according to the following new methods are particularly effective as depolarizing materials.

One of the new methods of making manganic phosphates consists in heating manganese dioxide in 10 to 15 times its weight of concentrated orthophosphoric acid to a temperature of about 250° F. until the manganese dioxide is dissolved. Water is then added to this solution to produce a precipitate of finely divided manganic phosphate which is then filtered, dried and if necessary further treated by milling in well known manner and then mixing it with such carbon blacks as for instance Shawinigan acetylene black.

According to the second method of preparing manganic phosphate for the purpose of the present invention, metallic manganese is anodically oxidized in an electrolyte of about 40 to 60% orthophosphoric acid at 180 to 200° F. The manganic phosphate obtained at the anode is then treated in the usual manner.

Cells according to this invention have a high discharge capacity and show very little drop in voltage from the peak discharge voltage. The voltage at the outset and upon closing the circuit any time after it has been opened is slightly lower than the discharge voltage.

It will be obvious to those skilled in the art that other acidic electrolytes than those described can be used for the purpose of the present invention and that many other modifications and variations are practicable within the scope of the present invention as defined in the following claims.

What is claimed is:

1. A primary cell comprising an anode; a cathode comprising a finely ground depolarizer mixture of manganic phosphate and an inert electrically conductive material; the manganic phosphate constituting at least 80% of the depolarizer mixture and an acidic electrolyte having a hydrogen ion concentration (pH) of less than about 5.

2. A primary cell according to claim 1 in which the depolarizer consists of about nine parts of finely divided manganic phosphate and one part of Shawinigan black, said mixture having been mixed until its color turns into a dark gray.

3. A primary cell according to claim 1 in which the anode comprises a metal of the group consisting of zinc and lead.

4. A primary cell according to claim 1 in which the electrolyte consists of an aqueous solution of fluoboric acid containing about 50% concentrated fluoboric acid.

References Cited in the file of this patent

UNITED STATES PATENTS 2,724,688     Gruner _____ Nov. 22, 1955

OTHER REFERENCES

Mellor, J. W.: "A Comprehensive Treatise on Inorganic and Theoretical Chemistry," Longmans, Green and Co., London, 1932, vol. XII, pages 460–462.

Vinal, G. W.: "Primary Batteries," John Wiley and Sons, New York, 1950, pages 74–75, 33–37.

Tranactions of the Electrochemical Society, vol. 90, 1946, pages 405–415.